April 16, 1929.   E. M. COLE   1,709,462
DRAFT DEVICE
Filed July 24, 1926

E. M. Cole — Inventor

By Parcel H Eaton
Attorney

Patented Apr. 16, 1929.

1,709,462

UNITED STATES PATENT OFFICE.

EUGENE M. COLE, OF CHARLOTTE, NORTH CAROLINA.

DRAFT DEVICE.

Application filed July 24, 1926. Serial No. 124,713.

This invention relates to an improved draft device for attaching any portable structure to a prime mover, and in which the prime mover may be quickly attached to and detached from the portable structure.

An object of my invention is to provide a draft device in which a prime mover may be adjustably attached to a portable structure, and one in which the adjustment can be quickly made without the necessity of removal and re-insertion of any bolts, and one in which there is a minimum of working parts.

Another object of my invention is to provide a draft device which is adapted to be built into the forward portion of any portable device, the said draft device having a plurality of holes therein, in which a draft link is adapted to be inserted in any one of the holes while the said draft link is out of normal position, and from which hole the draft link cannot be removed while in normal position.

Another object of my invention is to provide a draft mechanism composed of two parts, one part being adapted to be secured to any portable structure and the other part being adapted to be secured to a prime mover, the first part having a plurality of transversely arranged holes therein with grooves cut in the side portions of the first part and communicating with the holes, the second part being adapted to travel the said grooves while out of normal position for the purposes of inserting or retracting the second part from any one of the holes, but being so constructed as to prevent the second part from being removed from the said holes while the second part is in normal position.

Another object of my invention is to provide a draft device consisting of two parts, one part being adapted to be secured to any portable structure and the other part being adapted to be secured to a prime mover, said parts being capable of being quickly and easily separated from each other or joined together when desired, the said parts remaining in adjusted position under all normal working conditions.

Some of the objects of invention having been stated, other objects will appear as the description proceeds.

In the drawings, I have shown a preferred embodiment of my invention, in which—

Figures 1, 2:
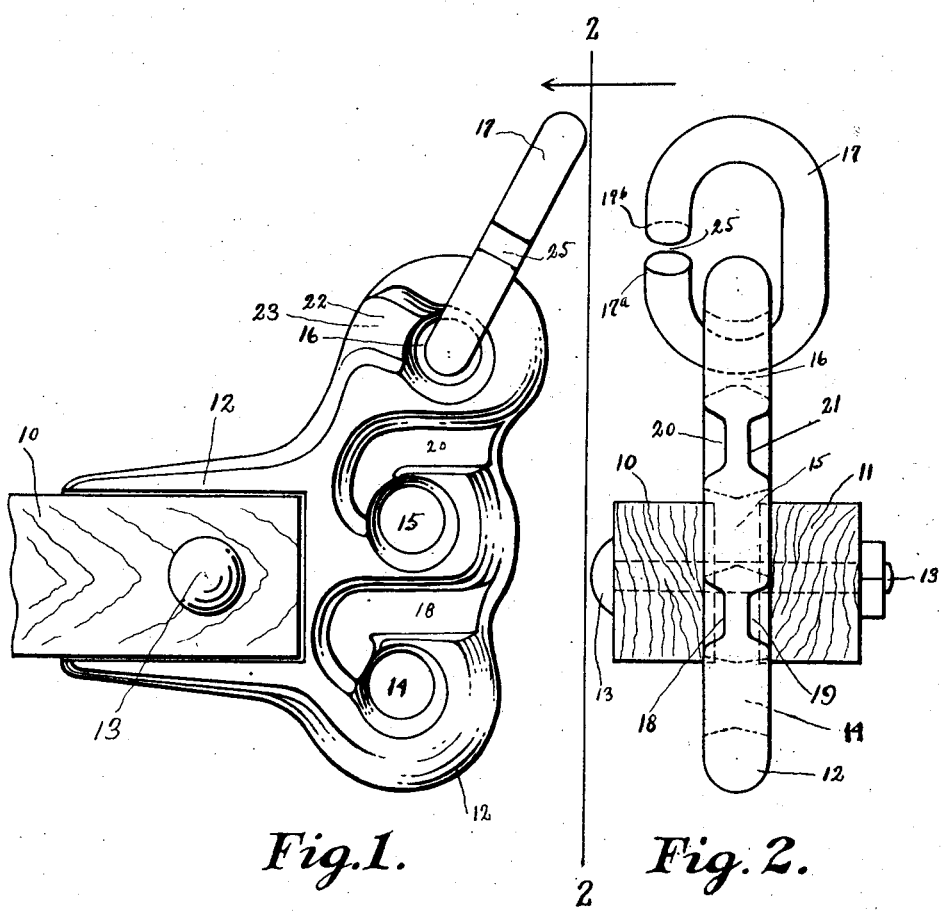
Figure 1 is a side elevation of my draft means.
Figure 2 is a front elevation of my draft means taken along the line 2—2 in Figure 1, and looking in the direction indicated by the arrow.

The numerals 10 and 11 indicate the front portions of the frame members of an agricultural machine, such as a guano distributor or cultivator, but I desire it to be understood that my draft device may be used with any portable structure. The draft member 12 is secured between the members 10 and 11 by means of the bolt 13 traversing and penetrating these parts, which firmly binds the parts together. The member 12 has a plurality of holes 14, 15 and 16 therethrough, in any one of which holes the draft link 17 is adapted to be adjustably secured. This draft link 17 is adapted to be secured to any prime mover.

The holes 14 and 15 have grooves 18 and 19, and 20 and 21, respectively, leading therefrom, which grooves are cut or molded in the side portions of the member 12 and extend rearwardly, upwardly, and forwardly. The grooves 20 and 21 are arranged opposite each other, and the grooves 18 and 19 are likewise arranged.

The grooves 22 and 23 which lead from the upper hole 16 are opposite each other, the groove 23 not appearing on the drawings, but being on the opposite side of the member 12 from the groove 22. These grooves 22 and 23 may be made of the same shape as the rest of the grooves for the lower holes, but in the preferred embodiment of the invention as shown in the drawings, I have shown these grooves as projecting rearwardly and upwardly to the outer edge of the member 12.

The draft link 17 is made of stiff material and is in the shape of an elongated link, and has a cutaway portion 25 in one side thereof, which cutaway portion is slightly larger than the thickness of the member 12 between any of the grooves, but which is smaller than the thickness of the member 12 at all other points engaged by the draft link.

Under normal conditions the draft link will remain in the position shown in the drawings, but when it is desired to adjust the draft link with relation to the member 12 the operator seizes the draft link 12 and turns the same approximately ninety degrees in a counter-clockwise direction, referring to Figure 2, and in this position the ends 17$^a$ and 17$^b$ of the draft link 17 will be in the hole, and the ends 17$^a$ and 17$^b$ may be pushed along the grooves until the draft link 17 is entirely released from the member 12, and may be inserted in any other hole in the draft member 12 by placing the ends 17$^a$ and 17$^b$ in any other set of grooves and pushing the link along until the same engages the desired hole. The link 15 is then turned backward to its original position where it will remain until manually removed from the hole by a repetition of the operation just described.

My device is so constructed that when draft is not applied thereto, such as while turning a cultivator at the end of a row, the draft link will remain in the hole in which the same is adjusted and will not accidentally shake loose and thus permit the prime mover to become disengaged from the portable frame structure.

I desire it to be understood that although specific terms are employed in this specification they are used in a generic and descriptive sense and are not used for the purpose of limitation, the scope of the invention being set forth in the appended claim.

I claim:

An adjustable draft mechanism comprising a flattened member adapted to be attached to an agricultural implement and being vertically disposed, a plurality of transversely disposed holes in said member, oppositely disposed grooves in said member, said grooves leading from the holes backwardly, then upwardly, then forwardly to the front portion of said member, an elongated draft link having a portion cut away on its side portion, said cut away portion being large enough to traverse the grooves when turned to a non-pulling position, and being too small to be removed from and inserted into the holes except thru the grooves.

In testimony whereof I have affixed my signature.

EUGENE M. COLE.